US009446650B2

(12) United States Patent
Willems

(10) Patent No.: US 9,446,650 B2
(45) Date of Patent: Sep. 20, 2016

(54) ELECTRIC DAMPER ASSEMBLY

(71) Applicant: Audi AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/437,745

(22) PCT Filed: Oct. 10, 2013

(86) PCT No.: PCT/EP2013/003046
§ 371 (c)(1),
(2) Date: Apr. 22, 2015

(87) PCT Pub. No.: WO2014/063786
PCT Pub. Date: May 1, 2014

(65) Prior Publication Data
US 2015/0273969 A1    Oct. 1, 2015

(30) Foreign Application Priority Data

Oct. 26, 2012 (DE) .................. 10 2012 021 018

(51) Int. Cl.
*B60G 17/015* (2006.01)
*B60G 17/06* (2006.01)
*F16F 15/03* (2006.01)
*F16F 7/10* (2006.01)
*H02K 49/02* (2006.01)

(52) U.S. Cl.
CPC ........... *B60G 17/0157* (2013.01); *B60G 17/06* (2013.01); *F16F 7/1011* (2013.01); *F16F 15/035* (2013.01); *H02K 49/02* (2013.01); *B60G 2400/252* (2013.01)

(58) Field of Classification Search
CPC combination set(s) only.
See application file for complete search history.

(56) References Cited

U.S. PATENT DOCUMENTS

| 5,027,048 A | * | 6/1991 | Masrur | B60G 13/14 177/184 |
| 5,060,959 A | * | 10/1991 | Davis | B60G 13/14 267/64.24 |
| 5,070,284 A | | 12/1991 | Patil et al. | |
| 6,859,702 B2 | | 2/2005 | Kawashima | |
| 8,573,604 B2 | * | 11/2013 | Willems | B60G 13/14 180/165 |
| 2002/0089128 A1 | * | 7/2002 | Charaudeau | B60G 17/0157 280/5.502 |
| 2010/0207309 A1 | * | 8/2010 | Park | B60G 13/14 267/195 |
| 2012/0193179 A1 | | 8/2012 | Gysen et al. | |

(Continued)

FOREIGN PATENT DOCUMENTS

DE         101 15 858      10/2002
DE       102010008009      11/2010

(Continued)

*Primary Examiner* — Nicole Verley
(74) *Attorney, Agent, or Firm* — Henry M. Feiereisen LLC.

(57) ABSTRACT

An electric damper assembly includes a damper having a rotor and a stator which connect a first component and a second component movable relative thereto, excitation windings, and induction windings, wherein a rotation of the rotor in relation to the stator causes a rotation of the excitation windings relative to induction windings, thereby inducing an induction voltage in the induction windings. A sensor detects the movement of the first component relative to the second component. A control unit is connected to the sensor and the damper. The control unit supplies the excitation winding with electric energy in such a way that an electromagnetic rotary field is generated which is dependent on the detected movement, and thereby is superimposed on the rotation of the rotor relative to the stator.

7 Claims, 2 Drawing Sheets

(56) References Cited

U.S. PATENT DOCUMENTS

| | | |
|---|---|---|
| 2013/0049508 A1 | 2/2013 | Willems |
| 2013/0154277 A1 | 6/2013 | Willems |
| 2013/0154404 A1* | 6/2013 | Willems ............... F16F 9/12 310/38 |
| 2013/0320791 A1* | 12/2013 | Willems ............. B60G 13/14 310/83 |
| 2015/0197131 A1* | 7/2015 | Park ................... B60G 15/04 267/195 |

FOREIGN PATENT DOCUMENTS

| | | |
|---|---|---|
| DE | 102010014185 | 1/2011 |
| DE | 102009048818 | 4/2011 |
| DE | 102010035084 | 2/2012 |
| DE | 102011009608 | 8/2012 |
| EP | 1 197 363 | 4/2002 |
| EP | 1 582 383 | 10/2005 |
| EP | 2 012 042 | 1/2009 |
| JP | 2004-215375 | 7/2004 |

* cited by examiner

ELECTRIC DAMPER ASSEMBLY

CROSS-REFERENCES TO RELATED APPLICATIONS

This application is the U.S. National Stage of International Application No. PCT/EP2013/003046, filed Oct. 10, 2013, which designated the United States and has been published as International Publication No. WO 20141063786 and which claims the priority of German Patent Application, Serial No. 10 2012 021 018.3, filed Oct. 26, 2012, pursuant to 35 U.S.C. 119(a)-(d).

BACKGROUND OF THE INVENTION

The invention relates to an electric damper assembly for a motor vehicle.

JP 2004215375 discloses an electrical damper assembly for a motor vehicle. In a known manner, an electrical damper assembly for a motor vehicle includes an electric damper with a rotor and a stator, The damper connects a first component and a second component that is movable relative thereto, with one component being connected to the rotor, the other component to the stator. Furthermore, provision is made for excitation windings and induction windings, wherein a rotation of the rotor in relation to the stator causes a rotation of excitation windings in relation to induction windings. The excitation windings are supplied with electric energy to generate an electromagnetic field. A movement of excitation windings relative to induction windings induces an induction voltage in the induction windings.

SUMMARY OF THE INVENTION

The sub-claims form advantageous refinements of the invention.

The object is achieved according to the invention by an electric damper assembly which includes a damper having a rotor and a stator, with rotor and stator connecting a first component and a second component movable relative thereto, excitation windings and induction windings, wherein a rotation of the rotor in relation to the stator causes a rotation of the excitation windings relative to induction windings, wherein the excitation windings are supplied with electric energy to generate an electromagnetic field, wherein a movement of excitation windings in relation to induction windings induces an induction voltage in the induction windings, wherein the electric damper assembly further includes a sensor which detects the movement of the first component relative to the second component. Further, provision is made for a control unit which is connected to the sensor and the damper, wherein the control unit provides the excitation winding with electric energy such that an electromagnetic rotary field is created, the direction and rotation speed of which being dependent on the detected movement. The electromagnetic rotary field is hereby superimposed on the mechanical rotation of the rotor relative to the stator.

As a result of the superimposition of the mechanical rotational movement with the electromagnetic rotary field, the relative rotation speed of the exciter field can be influenced in relation to the induction windings. As a result, the speed of the rotation of the electromagnetic field relative to the stator and thus the damping property can be influenced.

Preferably, the control unit is configured such that an electromagnetic rotary field is generated, the direction of rotation of which corresponding to the direction of rotation of the rotation of excitation windings relative to induction winding.

A superimposition of the two rotational movements in a same direction results in an increase of the rotation of exciter field relative to induction windings. The increased rotation speed causes an increased induction in the induction windings so that the electric damper opposes the mechanical movement to a greater extent.

A particularly advantageous configuration is realized by connecting the excitation windings to the rotor and the induction windings to the stator.

According to a further configuration, the damper assembly is configured such that the first component is a control arm of a chassis of a vehicle, and the second component is a part of a vehicle body.

It is of particular advantage in this assembly when the sensor is arranged between control arm and vehicle body in order to detect the spring travel and the acceleration of the control arm and therefore of the wheel typically connected to the control arm.

This detected movement is in particular computed by the control unit such as to determine the necessary rotation direction and rotation speed of the electromagnetic rotary field from the vertical movement of the wheel or control arm and to adapt the electromagnetic rotary field by appropriately acting on the excitation windings. The moment generated as a result of the induced voltage is proportional to the relative speed between rotor and stator.

According to a further advantageous configuration, the control arm is articulated via a thrust rod (push rod) to the damper. Since especially flapping movements of the wheel in relation to the vehicle body have to be attenuated, the provision of a push rod is suitable for the introduction of the forces into the damper.

BRIEF DESCRIPTION OF THE DRAWING

Further advantages, features and applications of the present invention will become apparent from the following description in conjunction with the exemplary embodiments illustrated in the drawings.

In the description, in the claims and in the drawing, the terms and assigned reference signs listed in the below list of reference signs are used. It is shown in the drawing in:

DETAILED DESCRIPTION OF PREFERRED EMBODIMENTS

Figure 1:
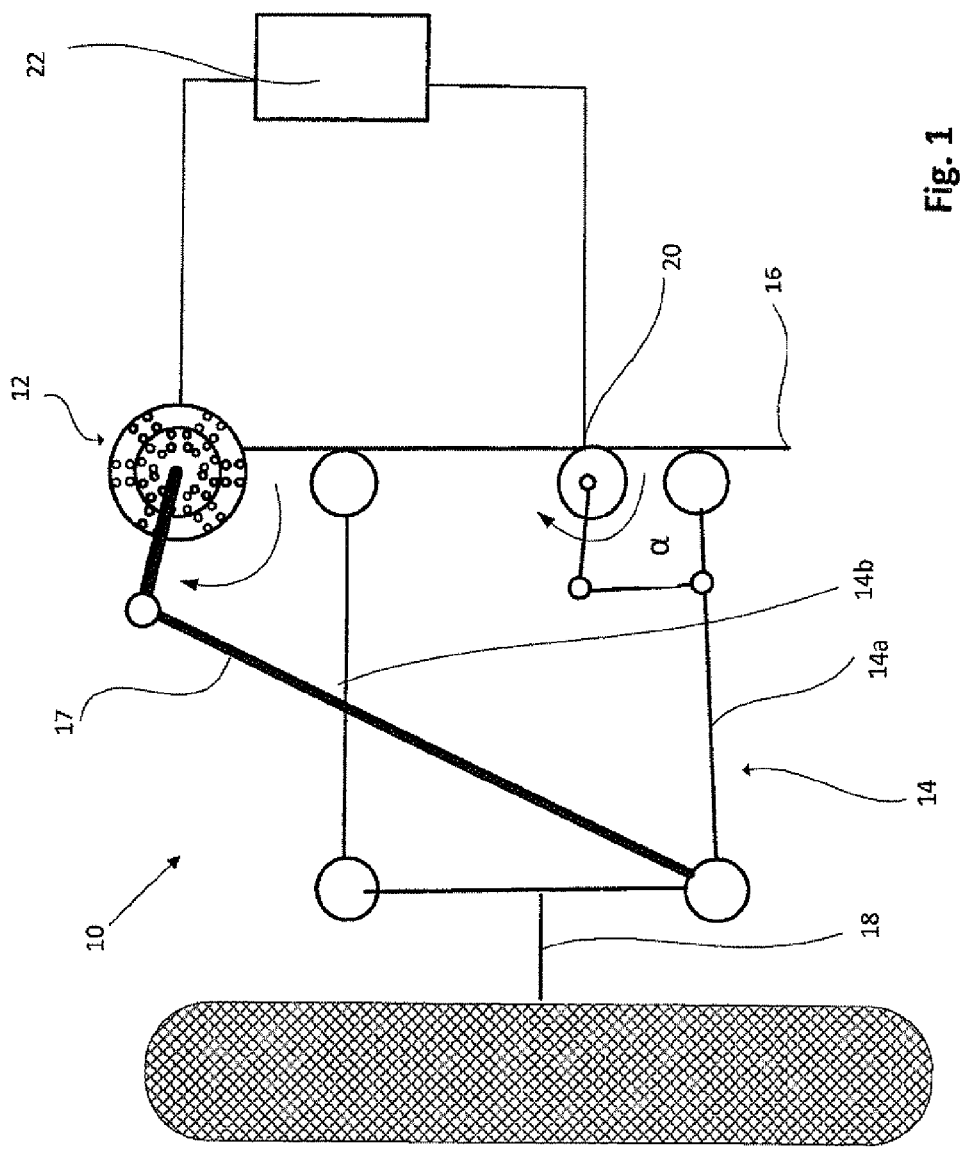
FIG. 1 a basic illustration of a damper assembly.

FIG. 1 shows a basic illustration of a damper assembly 10 according to the invention. An electric damper 12 connects here two components movable relative to one another, namely a vehicle body 16, especially a subframe, and a transverse control arm 14. The transverse control arm 14 is provided with a wheel carrier 18 which is held by upper transverse control arm 14a and lower transverse control arm 14b. As a result, the assembly allows a vertical movement of the wheel or the wheel carrier 18 by enabling the transverse control arms to swing about their attachment points upon the vehicle body. This movement is transmitted by the wheel carrier as a result of the connection of the rotor of the damper 12 via a thrust rod 17 push rod. The stator of the damper 12 is connected in fixed rotative engagement to the vehicle body 16. A movement of the wheel is converted by the push rod 17, which is articulated to the rotor of the damper, into a rotational movement.

According to the invention, a rotary sensor 20 is provided on the vehicle body 16 and connected to the transverse control arm 14. This sensor detects the spring travel of the wheel and transmits it to a control unit 22. The control unit 22 is connected to the electric damper 12 in particular to the rotor thereof. The rotor is provided with excitation windings, which are acted upon by the control unit with a rotary field of a rotation direction which corresponds to the rotation direction transmitted by the vertical wheel movement to the damper. As a result, the rotation of the excitation field in relation to the stator windings, formed here as induction windings, is significantly increased. The thus-generated countermoment is greatly increased compared with a static field so that an improved damping effect is realized.

Whether the push rod is attached to the wheel carrier 18 or to the lower transverse control arm 14b or upper transverse control arm 14a is hereby secondary. What is essential is that the movement or the transverse control arm 14 is transmitted to the electric damper 10 such that a torque generated by the latter opposes the movement of the control arm.

Figure 2:
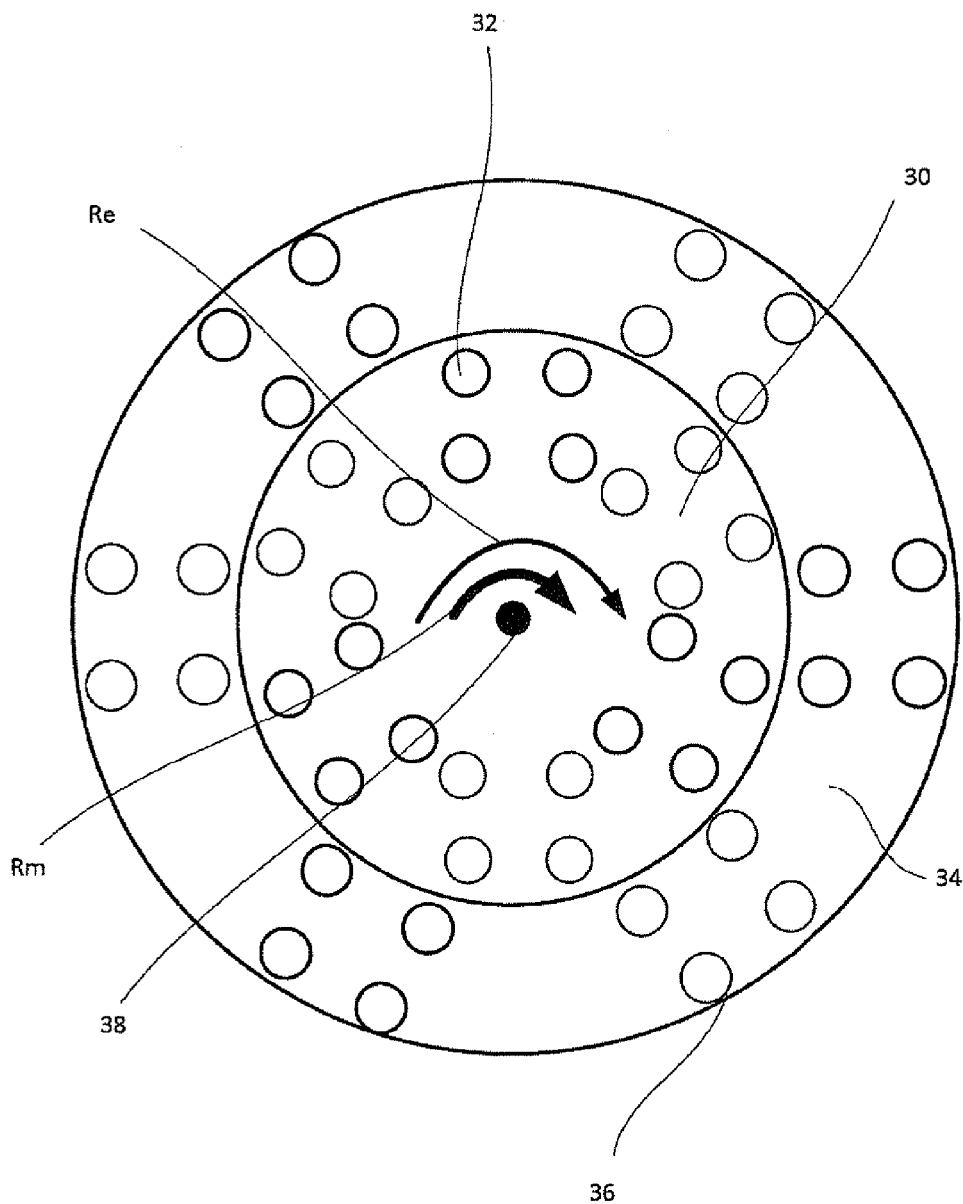
FIG. 2 a basic illustration of an electric damper according to the invention.

FIG. 2 shows a schematic sectional view of an electric damper 12 according to the invention, as shown in FIG. 1. The damper 12 includes a rotor 30 which is provided with excitation windings 32. In addition, the damper 12 includes a stator 34 which is provided with induction coils 36. A lever may be provided on the rotor shaft 38 for the articulation of the push rod, to generate the rotational movement of the rotor 30. An electromagnetic rotary field is generated in the same rotational direction as the rotor 30 rotates relative to the stator 32 and rotates as a rotary field in this direction. The increased speed between excitation field and stator field, as a result of the rotary field leads to an increased braking torque as opposed to a static field.

What is claimed is:

1. An electric damper assembly, comprising:
   a damper having a rotor and a stator, the rotor and the stator connecting a first component and a second component movable relative thereto, with one of the rotor and the stator having excitation windings, and the other one of the rotor and the stator having induction windings, wherein a rotation of the rotor in relation to the stator causes a rotation of the excitation windings relative to induction windings to thereby induce an induction voltage in the induction windings;
   a sensor configured to detect a movement of the first component relative to the second component; and
   a control unit connected to the sensor and the damper and configured to supply the excitation windings with electric energy in such a way that an electromagnetic rotary field is generated which is dependent on the movement detected by the sensor and is superimposed on the rotation of the rotor relative to stator.

2. The damper assembly of claim 1, wherein the electromagnetic rotary field, generated by the control unit, has a rotation direction which corresponds to a rotation direction of a rotation of the excitation windings relative to the induction windings.

3. The damper assembly of claim 1, wherein the excitation windings are connected to the rotor and the induction windings are connected to the stator.

4. The damper assembly of claim 1, wherein the first component is a control arm of a chassis of a vehicle, and the second component is a vehicle body.

5. A chassis of a motor vehicle, comprising:
   a first component in the form of a control arm, wherein a second component in the form of a vehicle body is movable relative to the first component; and
   a damper assembly including a damper having a rotor and a stator, the rotor and the stator connecting the first and second components, with one of the rotor and the stator having excitation windings, and the other one of the rotor and the stator having induction windings, wherein a rotation of the rotor in relation to the stator causes a rotation of the excitation windings relative to induction windings to thereby induce an induction voltage in the induction windings, a sensor arranged between the control arm and the vehicle body to detect a movement of the first component relative to the second component and thereby a spring travel and an acceleration, and a control unit connected to the sensor and the damper and configured to supply the excitation windings with electric energy in such a way that an electromagnetic rotary field is generated which is dependent on the movement detected by the sensor and is superimposed on the rotation of the rotor relative to stator.

6. The chassis of claim 5, wherein the control unit is configured such that the measured spring travel and the acceleration are adapted in a rotation direction and rotation speed of the electromagnetic rotary field.

7. The chassis of claim 5, further comprising a push rod configured to articulate the control arm to the damper.

* * * * *